Jan. 17, 1956  J. CORYDON II  2,731,289
RUBBER PNEUMATIC AUTO BUMPER ACCESSORIES
Filed June 26, 1950  2 Sheets-Sheet 1
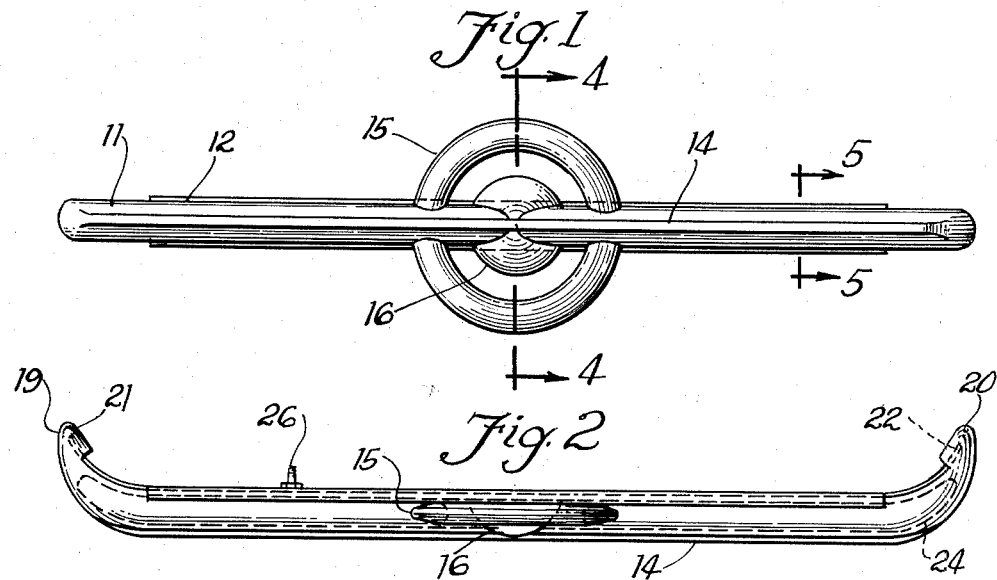
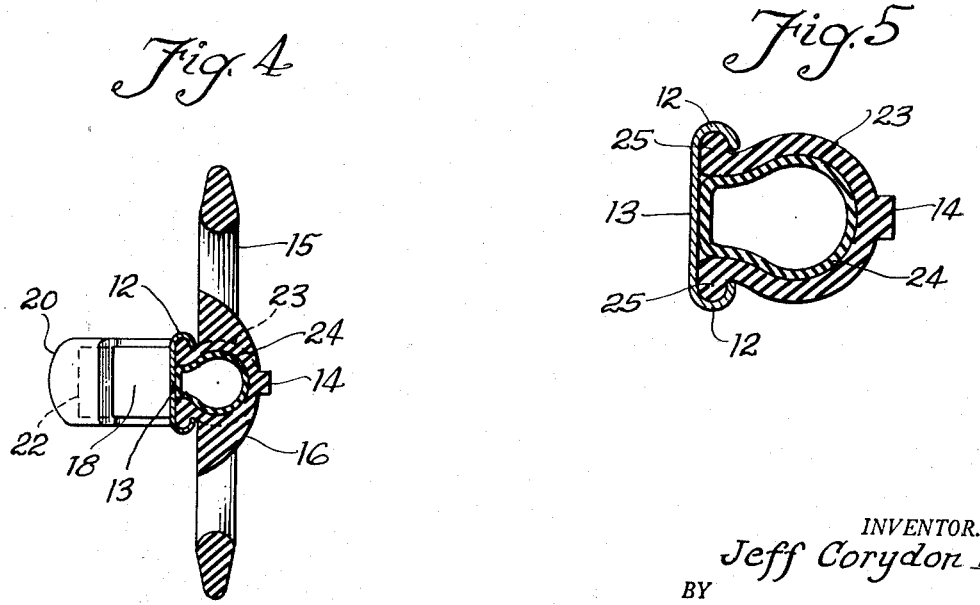
INVENTOR.
Jeff Corydon II
BY
J. Warren McCaffrey
ATTORNEY Jan. 17, 1956  J. CORYDON II  2,731,289
RUBBER PNEUMATIC AUTO BUMPER ACCESSORIES
Filed June 26, 1950  2 Sheets-Sheet 2
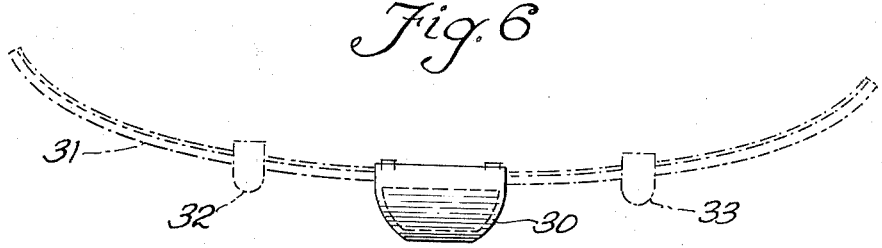
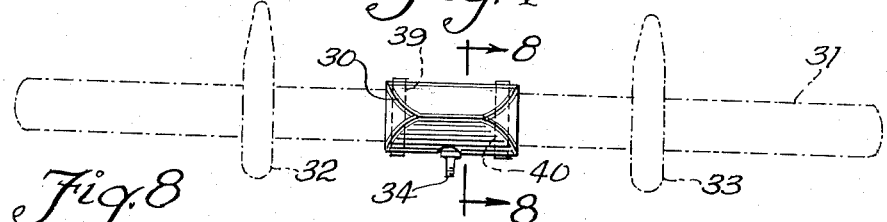
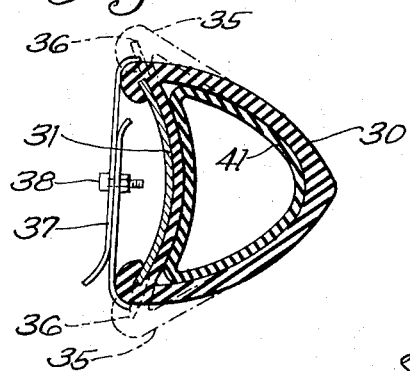
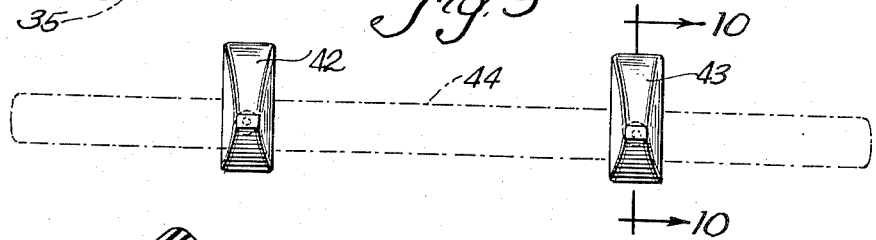
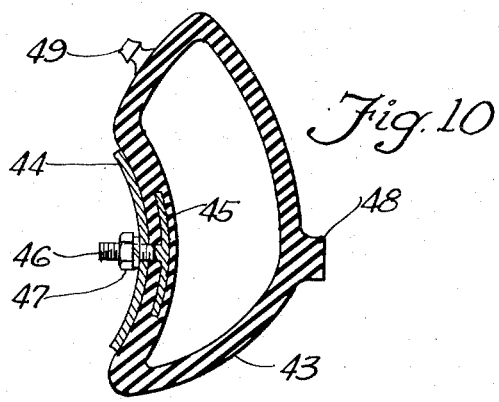
INVENTOR.
Jeff Corydon II
BY
J. Warren McCaffrey
ATTORNEY United States Patent Office 2,731,289
Patented Jan. 17, 1956

2,731,289

RUBBER PNEUMATIC AUTO BUMPER ACCESSORIES

Jeff Corydon II, Chicago, Ill.

Application June 26, 1950, Serial No. 170,415

4 Claims. (Cl. 293—67)

This invention relates to automobiles and more particularly to important automobile accessories.

The object of the invention is to provide means for absorbing the shock and noise that results from an auto striking another auto, a post or pole, or any upright nonyielding object.

Another object of the invention is to provide pneumatic means for absorbing bumps, shock and noise when two autos collide in traffic or in parking.

The specific object of the invention is to provide pneumatic means for mounting at the front and back of an auto for protection of said auto and for absorbing bumps, shock and noise when said pneumatic means comes in contact with the bumper and bumper guards of another auto either while moving along in traffic, or coming to an abrupt stop in traffic lanes, or maneuvering for a parking space.

This invention has special value in its application to pleasure cars, station wagons, light trucks, and the like. However, it is not the intention of the inventor that there be any limitation of the use of his invention to only lighter equipment. On the other hand, it might not be practical or economically feasible to use his pneumatic means on mobile farm equipment, mobile fire apparatus and heavy duty trucks and trailers.

Other objects of the invention are to provide pneumatic means made of rubber, or similar resilient material, for protecting an auto at much less cost compared to the wide variety of over designed and expensive chromium plated metallic bumpers and bumper guards now used on pleasure cars; for cushioning the impact when autos collide; for deadening the noises when autos collide; for augmenting the design of the auto with useful but decorative pneumatic bumpers and guards; and for avoiding the locking of over riding metallic bumpers and the interlocking of metallic bumper guards.

The foregoing objects and other valuable features of the invention will become readily apparent from the following detailed description, supplemented by the disclosures contained in the accompanying drawings, to be limited only by the specific claims appended later herein.

Referring to the accompanying drawings,

Fig. 1 is a front view of the pneumatic rubber bumper with a circular design of rubber guard for protecting the grill work of the auto and avoiding overlapping of bumpers and interlocking of bumper guards.

Fig. 2 is a top view of the same.

Fig. 3 is a front view of a clincher type spring steel bumper bar on which the pneumatic bumper of this invention may be mounted.

Fig. 4 is an enlarged vertical sectional view of the pneumatic rubber bumper and rubber guard taken along line 4—4 of Fig. 1.

Fig. 5 is an enlarged vertical sectional view of the pneumatic rubber bumper taken along line 5—5 of Fig. 1.

Fig. 6 is a top view of a rubber pneumatic bumper guard mounted on a typical bumper between two previously mounted metallic bumper guards.

Fig. 7 is a front view of the same.

Fig. 8 is an enlarged vertical sectional view of the same along line 8—8 of Fig. 7 with a clamping means for holding the bumper guard on the narrower types of metallic bumpers and the dotted lines indicating how the same bumper guard can grip wider bumpers without the clamping means.

Fig. 9 is a front view of another type of rubber bumper guard mounted in pairs on a typical metallic automobile bumper.

Fig. 10 is an enlarged vertical sectional view of the same along line 10—10 of Fig. 9.

The pneumatic rubber bumper is illustrated in detail in Figs. 1 to 5 inclusive in which 11 represents the rubber tire-like bumper held in place by the clincher rim 12 of the auto's bumper bar 13. A protruding edge 14 which extends horizontally across the face of the bumper is also made out of rubber and is designed to take all of the direct contact, rubbing action, and scuffing that usually occurs when two auto bumpers come in contact with each other. Mounted out on the bumper 11 is a circular ring 15 of rubber which extends up in front of the grill on the average auto and will serve as a protection for the front of the auto and its relatively fragile and expensive grill work. Cooperating with ring 15 in protecting the front of the auto is a central circular rubber dome 16 which is molded around the bumper 11 and is centrally disposed with respect to ring 15. In appearance the two elements look like a target when viewed from in front of the auto as shown in Fig. 1, and this design will be referred to hereafter as the target design.

It is also within the scope of this invention that this additional protection may be designed to provide a variety of appearances and shapes but always for the purpose of supplementing the protection afforded by the pneumatic rubber bumper described. Preferably ring 15 and dome 16 comprising the target design, or the elements of any other design constructed on the bumper 11 for further protecting the front of the auto, would be made out of the same material and texture as bumper 11. However, it is also conceivable that it might be desirable to make the auxiliary protective means out of softer rubber, or other rubber-like material, instead of the same materials as the bumper 11. In the preferred embodiment of this invention the bumper and target guard are constructed out of the same material and texture as automobile tires without any cording for reinforcement.

The ends 17 and 18 of the steel bumper bar 13 are curved back. The ends 19 and 20 of the pneumatic rubber bumper 11 are curved back similarly and have slots 21 and 22 for encasing curved ends 17 and 18. In mounting the rubber bumper 11 on the clincher type of steel bumper bar 13, one curved end 19 would be fitted over the end of the bumper bar by fitting end 17 into slot 21. Then the rubber tire-like casing 23, after insertion of the sausage-shaped innertube 24, would be fitted to the clincher type bumper bar 13 by inserting the edges 25 under the rims 12 of the C-shaped clincher type bumper bar 13. Then the rubber tire-like casing 23 can be pulled before inflating the innertube 24 until the end 20 is bent around curved end 18 and when the pull is released the end 18 slides into slot 22. Now the innertube 24 may be inflated by admitting air under pressure through valve 26 which extends back through oval opening 27 in steel bumper bar 13.

It is expected that the pneumatic rubber tire-like bumper described herein will become standard equipment on autos built in the future. In the meantime, smaller adaptations of the pneumatic rubber bumper are described herein for application to autos now in use with metal bumpers already installed. Types of such rubber pneumatic accessories are illustrated in Figs. 6 to 10 inclusive on the second sheet of drawings accompanying this specification.

Fig. 6 is a top view and Fig. 7 is a front view of a rubber pneumatic bumper guard 30 fastened to an auto bumper 31 between already installed metallic bumper guards 32 and 33. Air can be pumped into the rubber bumper guard 30 through the valve 34. It is within the scope of the invention to fasten one or more such rubber guards to both the front and rear metal bumpers of any auto. For example in the drawings beside the rubber guard shown in place between the two metallic bumper guards, it is within the scope of the invention to fasten another rubber guard similar to 30 to the left of metal bumper guard 32 and another to the right of metal bumper guard 33.

Fig. 8 is an enlarged sectional view which reveals the almost universal application of the bumper guard of this invention. Whereas, the length of bumpers are fairly uniform the width or depth of bumpers varies considerably. The casing of the rubber pneumatic bumper 30 of this invention would be molded to conform to the larger size indicated by the dotted outlines 35. This larger bumper guard would be hooked over the deeper bumper by fitting notches 36 around the upper and lower edges of the metallic bumper.

The same rubber bumper guard 30 can be mounted on a narrower metallic bumper 31 in the same manner described above, but it will be necessary to fasten the ends of the bumper guard around the ends of the bumper with a clamping means 37. The clamping means consists of a pair of metal strips slidably fitted into a metal sleeve and adapted at the ends to curve over or into the outside edges of the top and bottom 35 of the bumper guard. When adjustably mounted on the metallic bumper guard a bolt is fastened through the metal sleeve and two metal strips shown at 38 and secured with a nut. So as to prevent possible movement along the bumper 31 it is within the scope of this invention to employ two or more of such clamping means as shown at 39 and 40 depending upon the length of the bumper guard. A rubber bladder 41 when inflated with air through valve 34 will conform to the interior of the casing and strengthen the bumper guard to resist pressure, absorb the shock of contacts and lessen the noise resulting from bumping contacts.

Another type of bumper guard which can be used in lieu of metallic bumper guards is shown mounted in pairs at 42 and 43 on a metallic bumper 44 in Fig. 9. Fig. 10 is a vertical sectional view through pneumatic rubber bumper guard 43 along line 10—10 of Fig. 9, and shows the detail of construction of the bumper guard and its means of mounting on a metallic bumper. The casing 43 is molded in the shape shown in Figs. 9 and 10 with a round metal plate 45 molded in the back wall of the casing substantially as shown in Fig. 10. A bolt-like element 46 extends perpendicular to the back face of metal plate 45 through a hole in the bumper 44 and is fastened securely to the bumper with a nut and washer indicated as 47. A scuffing edge 48 like element 14 in the pneumatic bumper previously described is molded horizontally along the outermost point on the outside front face of casing 43. Air to inflate and strengthen the bumper qualities of the bumper guard 43 is introduced to the interior of the casing through valve 49. Air may also be introduced by hypodermic means not shown in the drawing and thus eliminate protruding valve stem 49.

It is within the scope of the invention to have a bladder inside of casing 43 if the material and texture of the casing is porous just as is shown in Fig. 8 for bumper guard 30. On the other hand if the casings of bumper guards 30 and 43 are made out of the same material and texture as the usual auto rubber tires, or some material less porous, it is within the scope of the invention to eliminate the use of bladders for both types of bumper guards shown.

What I claim is:

1. A rubber pneumatic auto accessory comprising a relatively narrow casing in comparison to an elongated vertical sectional shape similar to a kidney, said casing having a metallic plate molded in the smaller back side of said kidney shaped casing with a greater thickness of rubber to the outside of said plate than to the inside of said casing, said metallic plate having a threaded bolt-like element extending at right angle from the back of said plate and integral with it for insertion through a suitable hole in an auto bumper, means for fastening said bolt-like element to said bumper, and said casing having a protruding rubber rib running horizontally across the face of the larger side of said kidney shaped casing.

2. A rubber pneumatic bumper guard of the class described comprising a rubber casing which is substantially longer in a vertical plane than in a horizontal plane, the rear wall of said casing being molded around a circular plate which has a bolt integral with its rear face that extends out through the casing wall, said plate having a greater thickness of rubber on the side with the bolt for better fastening of said bumper guard, and said casing having a horizontal rib across its front face and a means located in the upper section of the rear wall for admitting air into said casing.

3. A bumper guard comprising a rubber casing having means for attachment to a bumper molded in its rear wall, said rubber casing being designed to extend substantially above and below any bumper to which it may be attached, said casing also having valve means in its rear wall above the area for attaching said casing to any bumper for introducing and holding air in said casing under low pressures but above atmospheric pressure, said means for attachment of casing to bumper consisting of a curved metal plate molded in the rear wall with a threaded bolt integral with the concave face of said plate and extending at right angle therefrom, and said bolt extending through the greater part of the rear wall of said casing and sufficiently further for insertion in any bolt hole in any bumper designed to receive a bumper guard.

4. A bumper guard comprising a rubber-like casing having means for attachment to a bumper molded in its lower rear wall, said rubber-like casing being constructed so as to extend substantially both above and below any bumper to which it may be attached, said casing also having means in its upper rear wall for introducing and holding air in said casing under low pressures but above atmospheric, said means for attaching said casing to a bumper consisting of a circular plate molded in the lower rear wall of the casing with a threaded bolt integral with and perpendicular to the center of the back of said circular plate, said bolt extending through most of said lower rear wall of said casing and substantially beyond for insertion in any bolt hole in any bumper designed to receive a bumper guard, and said rubber-like casing having a protruding horizontal scuffing edge across its face.

References Cited in the file of this patent

UNITED STATES PATENTS

| | | |
|---|---|---|
| D. 115,146 | Falcon | June 6, 1939 |
| 1,724,431 | Spear | Aug. 13, 1929 |
| 1,881,390 | Schmidt | Oct. 4, 1932 |
| 1,885,474 | Pat | Nov. 1, 1932 |
| 1,978,179 | Weiland | Oct. 23, 1934 |
| 2,236,507 | Kreitz | Apr. 1, 1941 |
| 2,243,462 | Fageol | May 27, 1941 |